(12) United States Patent
Mikami

(10) Patent No.: US 6,561,134 B1
(45) Date of Patent: May 13, 2003

(54) CRUSTACEAN LARVA RAISING METHOD AND APPARATUS

(75) Inventor: Satoshi Mikami, Mango Hill (AU)

(73) Assignee: Australian Fresh Research & Development Corporation Pty. Ltd., Queensland (AU)

( * ) Notice: Subject to any disclaimer, the term of this patent is extended or adjusted under 35 U.S.C. 154(b) by 0 days.

(21) Appl. No.: 10/048,032

(22) PCT Filed: Jul. 21, 2000

(86) PCT No.: PCT/AU00/00881
§ 371 (c)(1),
(2), (4) Date: Jun. 24, 2002

(87) PCT Pub. No.: WO01/06847
PCT Pub. Date: Feb. 1, 2001

(30) Foreign Application Priority Data

Jul. 23, 1999 (AU) .......................................... PQ 1776

(51) Int. Cl.[7] .............................................. A01K 61/00
(52) U.S. Cl. ...................................... 119/204; 119/205
(58) Field of Search ................................. 119/205, 204, 119/207, 208, 209, 210, 211, 212, 215, 217, 234, 236

(56) References Cited

U.S. PATENT DOCUMENTS

| | | | |
|---|---|---|---|
| 3,724,423 A | * 4/1973 | Day et al. .................... | 119/209 |
| 3,797,458 A | * 3/1974 | Day et al. .................... | 119/209 |
| 4,003,337 A | * 1/1977 | Moore ........................ | 119/224 |
| 4,036,176 A | * 7/1977 | McCarty et al. ............. | 119/207 |
| 4,182,267 A | * 1/1980 | Kominami et al. .......... | 119/226 |
| 4,300,477 A | 11/1981 | Chapman | |
| 4,438,725 A | * 3/1984 | O'Sullivan et al. .......... | 119/238 |
| 4,972,801 A | * 11/1990 | Hunt ........................... | 119/215 |
| 5,353,745 A | 10/1994 | Fahs, II | |
| 5,762,024 A | 6/1998 | Meilahn | |
| 5,961,831 A | * 10/1999 | Lee et al. .................... | 210/614 |
| 6,382,134 B1 | * 5/2002 | Gruenberg et al. .......... | 119/215 |

FOREIGN PATENT DOCUMENTS

| | | |
|---|---|---|
| AU | A-52470/86 | 8/1986 |
| WO | WO 97/38573 | 10/1997 |

* cited by examiner

Primary Examiner—Yvonne Abbott
(74) Attorney, Agent, or Firm—Arnold B. Silverman; Eckert Seamans Cherin & Mellott, LLC

(57) ABSTRACT

A crustacean larva raising method includes the steps of providing a tank (50) to hold larva raising medium, continuously supplying sterilized, filtered larva raising medium to the tank (50) through outlets (64) adapted to cause horizontal circulation of the medium and at an outlet flow velocity preventing larva damage, continuously draining the medium through a drain assembly (65) including a larva screen and maintaining the medium at a selected temperature. Apparatus to carry out the crustacean larva raising method comprises of modular channel sections (51, 52) of the tank (50), which are bolted and sealed together, two sub tanks (53, 54), a UV sterilizer unit (55) incorporating temperature control means and a submersible pump (56) to circulate filtered and pre-sterilized medium. A crustacean larva feeding composition and a method for preparing such a composition are also provided.

51 Claims, 6 Drawing Sheets

CRUSTACEAN LARVA RAISING METHOD AND APPARATUS

This invention relates to a crustacean larva raising method and apparatus.

This invention has particular but not exclusive application to larva raising method and apparatus for use with Thenus spp., and for illustrative purpose reference will be made to such application. However, it is to be understood that this invention and inventive elements thereof could be used in other applications, such as rock lobster and slipper lobster larvae.

There have been many attempts made to develop larva-rearing strategies for commercial species of crustacea. To date these have been concentrated on developing strategies for species of rock and slipper lobster larvae. A summary of these processes is given in Table 1.

TABLE 1

| Species | Authors | Survival | No. survived | Tank size |
|---|---|---|---|---|
| South African rock lobster (*Jasus lalandii*) | Kittaka (1988) | <1% | 1 from 15,000 | 100 l |
| Southern rock lobster (*Jasus edwardsii*) | Kittaka et al. (1988), | <1% | 2 from 16,000 | 100 l 72 l × 4 |
|  | Illingworth et al. (1997) | <1% | 1 from 6,000 |  |
| European rock lobster (*Palinurus elephas*) | Kittaka and Ikegami (1988) | <1% | 1 from 5,000 | 100 l |
| Japanese rock lobster (*Panulirus japonicus*) | Yamakawa et al. (1989) | <1% | 1 from 1,000 | 1 l bowls |
|  | Kittaka and Kimura (1989) | <1% | 2 from 20,000 | 100 l |
| Slipper lobsters (Ibacus spp.) | Takahashi and Saisho (1978) | 1.8% | 6/330 (nistos) | 100 l |
|  | Marinovic et al. (1994) | 15% | 6 from 40 | 7 l |

A chronology of larval efforts is given in Table 2.

TABLE 2

| Year | Bay Lobster species | Survival | Other Species | Survival |
|---|---|---|---|---|
| 1978 |  |  | Slipper lobsters (Ibacus spp) Takahashi and Saisho | 6 from 40 |
| 1988 |  |  | South African rock lobster (*Jasus lalandii*) Kittaka | 1 from 15,800 |
| 1988 |  |  | Southern rock lobster (*Jasus edwardsii*) Kittaka et al. | 2 from 16,000 |
| 1988 |  |  | European rock lobster (*Palinurus elephas*) Kittaka and Ikegami | 1 from 5,000 |
| 1989 |  |  | Japanese rock lobster (*Panulirus japonicus*) Yamakawa et al. Kittaka and Kimura | 1 from >1,000 1 from 20,000 |
| 1994 |  |  | Slipper lobster (*Ibacus peronii*) Marinovic et al. | 6 from 330 |
| 1995 | Successful larval rearing by small vessel (1 L glass bowls) | 1 larvae/L up to 100 (Survival 0–80%) |  |  |
| 1997 |  |  | Southern rock lobster (*Jasus edwardsii*) Illingworth et al. | 1 from 6,000 |

The present four major commercial-research rearing tank systems for rock and slipper lobster larvae are, for the Southern rock lobster, (*Jasus edwardsii*) the systems developed by the Tasmanian Aquaculture and Fisheries Institute (TAFI), for *J. edwardsii* and the Eastern rock lobster, (*Jasus verreauxi*) the systems developed by the National Institute of Water and Atmospheric Research (NIWA) of New Zealand, for the Japanese rock lobster, (*Panulirus japonicus*) the system developed by Fisheries Research Institute of Mie (FRIM), the Japan Sea-Farming Association (JSFA) and Research Institute for Science and Technology of The Science University of Tokyo, all of Japan. The broad features of these systems and the results published are as follows:

1. (TAFI)
    Southern rock lobster
    10 l water in 30 l tanks
    Stocking density of 20 newly hatched larvae per l
    No juveniles obtained.
2. Upwelling tank system (NIWA)
    Southern rock lobster
    Combination of 4×72 l tanks
    Stocking density of 26 newly hatched larvae per l
    Only one juvenile survived in 1990
3. Zero water movement tank system (FRIM)
    Japanese rock lobster
    150–180 l in 200 l tanks
    Stocking density of 20 newly hatched larvae per l
    Less than 1% survival to the juvenile stage (up to 10 juveniles)
4. (JSFA)
    Japanese rock lobster
    150–180 l in 200 l tanks
    Stocking density of 20 newly hatched larvae per l to 1 final stage larvae per l
    Approximately 1% survival to the juvenile stage (up to 100 juveniles)

Thenus spp., commonly known as Moreton Bay bugs, Slipper lobsters and Bay lobsters, are found along the entire northern coast of Australia from Shark Bay in Western Australia to Coffs Harbour in northern New South Wales (Kailola et al., 1993). There are two Thenus species: Mud bugs (Thenus sp.) and Sand bugs (*Thenus orientalis*). Mud bugs are brown overall and have brown stripes on their walking legs, while Sand bugs are speckled overall and have spots on their walking legs. Mud bugs prefer a bottom of fine mud, and are typically trawled from inshore coastal waters of 10 to 30 meters depth. Sand bugs tend to prefer sediments with a larger, coarser particle size, and are usually trawled from a depth of 30 to 60 meters in the coastal shelf and offshore areas.

Currently, commercial aquaculture of Moreton Bay bugs is not being carried out anywhere in the world. The major hurdle in commercialisation is the difficulty in maintaining the bugs through the larval stages. Like other slipper or rock lobster species, Moreton Bay bugs have a very characteristic flattened larval stage called the phyllosoma. They circulate in the plankton, rising and falling in the water column, and this makes it difficult to adjust the culture environment.

Recently however, a comprehensive study of the culture conditions of Moreton Bay bug phyllosomas was undertaken, suggesting high potential for commercial aquaculture of these species (Mikami, 1995). Phyllosomas of Moreton Bay bugs pass through four larval stages in 25 to 35 days, with a high level of survival on a small scale and take one year to achieve commercial size (250 g).

Following the study by Mikami (1995), further research has been undertaken by the present applicant over the past five years. The major aim of this study is the commercialisation of Moreton Bay bug aquaculture from the small, experimental scale. To date, the single most important issue has been to solve the technical aspects of Moreton Bay bug larval rearing.

In one aspect this invention resides in a crustacean larva raising method including the steps of:

providing a tank adapted to hold larva raising medium to a depth of at least 10 cm;

continuously supplying substantially sterilized, filtered larva raising medium to said tank through a plurality of outlets disposed about the tank and adapted to cause horizontal circulation of said medium and having an outlet flow velocity selected to prevent larva damage;

continuously draining said medium through a drain assembly including a larva screen having a flow velocity of said medium therethrough selected to prevent damage to larvae, and maintaining said medium at a temperature selected to accommodate the larva species to be raised.

In a further aspect, this invention resides broadly in crustacean larva raising apparatus including:

a supply of substantially sterilized, filtered larva raising medium;

a tank adapted to hold said larva raising medium to a depth of at least 10 cm;

a plurality of outlets connected to said supply and adapted to deliver and cause horizontal circulation of said medium in said tank;

drain means having a larva screen and configured to maintain a selected level in said tank, and temperature control means for said medium.

The larval rearing tank may be round or oval in horizontal cross section such that a continuous one-way circulation may be maintained. Alternatively, the larval rearing tank may comprise an annular tank. As a yet further alternative, the larval rearing tank may comprise an annular raceway having straight portions closed by end portions. Preferably, the raceway comprises a modular construction of curved and straight portions, whereby the linear dimensions and thus holding capacity may be selected. For example, the modular components may be moulded in plastics material and be adapted to be bolted up in assembly to form the raceway. The modular components may be provided with preformed joint sealing, or may in the alternative be sealed with an in situ cast sealing such as curable silicon or other sealant.

The tank depth is preferably less than one meter. Preferably, the water depth is maintained at about 10 to 20 cm. This relatively shallow depth will allow increasing feeding frequency of larvae. In the case of the preferred annular and or modular raceway construction, the section of the raceway may be for example 30 cm deep. Whilst the width of the section may be of any suitable dimension determined at least in part by the arrangement of the rearing media outlets, it is preferred that this dimension also be in the region of 30 cm.

For phyllosomas of Moreton bay bugs, a typical stocking density of about 40 newly hatched larvae per 1 is used, gradually reduced to about 10–15 final stage larvae per 1.

In order to increase floor area densities in industrial situations the tanks may be arrayed in stacks.

The medium will be selected according to the species to be raised. In general the medium will be seawater or synthetic seawater of composition selected to match the natural environmental medium in which the organism exists in the wild.

The water outlets may comprise a plurality of nozzles. The nozzles may be of a number selected to encourage the continuous one way circulation with consistent flow about the circuit. The number of nozzles and capacity of tank can be used to adjust the volumetric flow rate.

The flow velocity of the nozzles may be any flow velocity selected to maintain circulation in the tank whilst avoiding shearing injury to the larvae. The flow velocity is preferably maintained in the region of below 4 to 6 m per minute at least for early larval stages such as the at the 1 st phyllosoma stage of Moreton bay bugs. Preferably the flow rate is the minimum flow rate consistent with maintaining circulation of the medium in the tank.

The outlets may be located at the bottom of the tank or the top of the tank. For example, the outlets may be associated with a linear or ring mains manifold located at the bottom of the tank or at any position up the walls of the tank including above the medium level. There may be provided a single manifold or a plurality of manifolds. In one embodiment of the invention associated with the preferred modular raceway tank, the outlets are tubes with 4 mm nozzles extended from 19 mm polyethylene manifolds disposed on the upper portion of the inner and outer walls of the raceway and installed after assembly of the modular structure. The outlets extend down to the bottom of the tank and the nozzles are aimed in the direction of desired circulation and preferably directed somewhat inwardly away from the walls.

The medium may be supplied by a continuous one way system or may utilize some recirculation. For example, in a one way supply, the medium such as seawater may be filtered from a natural supply through a 1 $\mu$m filter and preferably a 0.5 $\mu$m filter in a header tank.

The drain means is preferably provided with a mesh size of about 1 mm. The flow rate across the mesh may be determined in each case empirically. However, it is preferred that the flow rate per unit area be much less than the inflow velocity and accordingly the surface are of the mesh is preferably maximized. The drain means may be used to maintain the level of medium in the tank. To this end the drain means may comprise a surface drain set to the desired level or 10–20 cm. Alternatively, the drain means may be located at any level in the medium column, whereupon the level may be medium supply/drain rate controlled. In cases where the drain controls the level, this may be provided by means of a meshed drain inlet of enlarged area relative to a standpipe taking the medium to waste or recirculation, which standpipe may be adjustable in length.

The tank may be provided with a cover or other means selected to occlude light from the tank at selected intervals. Light should be excluded from the tank in the daylight hours to maximise feeding frequency of the larvae. To this end it is preferred that the tank be formed of an opaque material.

Contamination by bacteria, protozoa or fungi is a serious problem for phyllosoma rearing. The major sources of contamination for larval rearing are incoming water, food, the air, human handling and the starter culture (eggs, water and newly hatched larvae from the hatching tank). Larval rearing water should be kept free from any organisms. Accordingly, after filtration the filtered seawater may then be sterilized by any suitable means such as UV sterilization, submicron filtration, chlorination, acidification or ozonisation. For example, the filtered seawater may be exposed to UV radiation from an arc or other source at above about 1 l/hour/Watt level to minimise bacteria.

Alternatively, chlorine at about 10 ppm may be maintained in incubation with the medium for about 12 hours, preferably without aeration, followed by the addition of sufficient sodium thiosulfate to neutralise the chlorine.

The temperature of the filtered, sterilized supply may be maintained in the desired range by any suitable means such as heaters and/or chillers with appropriate thermostats.

In the alternative to the one way system, there may be provided a semirecirculation system including the larval rearing tank and two or more sub tanks. Preferably, two sub tanks are used. The sub tanks are each of at least the same capacity as the larval rearing tank. In this embodiment, the sub-tank containing filtered, sterilized water may be circulated into the filled larval rearing tank for about 24 hours residence using a submersible pump. After 24 hours, the pump may be transferred to the other sub-tank, with the water controlled at about the same temperature, preferably within about ±0.5° C. Water may then be circulated into the larval rearing tank again. Preferably, the flow rate is the same as the one way flow-through system. While water in one sub-tank is being used, the other sub-tank may be emptied and dried.

In the case of semirecirculation, the rearing water may be sterilized by, for example, 10% chlorine for a period of 12 hours followed by neutralisation with 10% sodium thiosulphate. Preferably, the rearing water is tested such as by Palintest® (DPD No 1) before introducing into the rearing system to make sure no chlorine remains.

In the case of phyllosomas of Moreton bay bugs, the temperature range of the medium is preferably between 26–27° C. Phyllosomas can be reared at temperature ranges between 24–30° C., but temperatures lower than 26° C. will result in a slower growth rate, and those higher than 28° C. will increase the risk of unsuccessful moulting, cannibalism and disease. When larvae are transferred to the rearing tank, it is preferable to keep the temperature of the larval rearing system at substantially the same temperature ±0.5° C. as the source of the larva such as a hatching tank. If rearing water temperature has to be changed, temperature variation is preferably kept within 1 degree per hour.

The salinity of the medium may vary according to species. In the case of phyllosomas of Moreton bay bugs, the salinity may be maintained in the range of between 25–40 ppt and preferably between 34–36 ppt. Phyllosomas are extremely intolerant to sudden changes in salinity, so salinity change should be kept within ±1 ppt per day.

Throughout all phyllosoma stages, phyllosomas show strong photopositive reaction. To avoid congregation of larvae at the surface during the daytime, the rearing system may be covered such as by a black plastic sheet.

The level of pH may be kept at between 7–9, and preferably between 8.2–8.5 being the natural seawater pH level.

Strong aeration damages larvae, so it is preferred to avoid using aeration in the rearing tank. The oxygen level of the rearing water is preferably kept at more than 7 ppm, at 26–27° C. Larval oxygen consumption is very low, so the circulation of rearing water with a large surface area is generally adequate for supplying larval oxygen demand without aeration, with control of stocking density.

Under the flow-through system, the preferred maximum rearing densities of phyllosomas are:

40 first instar larvae per l
25 second instar larvae per l
10 third instar larvae per l and
5 fourth instar larvae per l.

Rearing density levels higher than this may result in a high level of cannibalism at the time of moult. Pre-moult/post-moult larvae are eaten by intermoult larvae.

The phyllosomas are preferably fed a controlled diet. The maximum phyllosoma growth and survival has been determined to be obtained by the use of chopped, fresh, live mollusc flesh, preferably live pipis (Donax spp.). Using frozen food will result in a slower growth rate than fresh food. Brine shrimp (Atemia spp.) can also be used, but only for 1st instar phyllosomas.

The use of live pipis occasionally causes a high level of mortalities at the time of moulting. This is called moult-death syndrome (MDS). The cause of MDS amongst other species is still unclear, but in the case of Thenus, MDS is related to seasonal variances in food quality. To obtain a standard quality of food, enrichment of bivalves is preferred.

Use the green micro-algae Nannochloropsis spp. or other micro-algae and/or diatom species such as Isochrsis spp., Chaetoceros spp. and Pavlova spp. for enrichment has proven useful. Enrichment may comprise culturing pipis at 25–28° C. with algae water at a cell density of preferably greater than $20 \times 10^7$. For example, there may be used approximately 1 kg of pipis (wet weight with shell) per 40 l of algae water. Preferably, the water is replaced every 12 hours. The enrichment process may be conducted for at least 24 hours and preferably 48 hours. The level of ammonia in the algae water should be maintained below 1 ppm. Flesh content of pipis (gut, gonad, gill and mantle) is approximately 20% of total weight.

Alternatively to the preferred algae, dried commercial species may be used such as Marine Sigma (Nisshin Science), Marine Growth (Nisshin Science), and Algamac-2000 (Bio Marine). The number of cells of these commercial products should be kept at >20 million per ml.

Food preparation may be by any suitable means. In the case of the preferred pipis, the flesh may be chopped roughly followed by washing through at least two grades of mesh, such as 0.5 to 2.0 mm for a first wash and thereafter <0.5 mm. The large mesh size is preferably varied according to larval stage. For example, there may be used 1.0 mm for the first instar, 1.5 mm for the 2nd instar and 2.0 mm for the 3rd and 4th instars. The pieces of chopped flesh retained between the large and small mesh sizes may be set aside. The pieces of flesh retained in the large size mesh may be chopped again, repeating the above process.

Food must be sterilised before feeding in order to avoid bacterial contamination. For example, the flesh may be washed in UV sterilised seawater carefully, and then incubated in 0.1% chlorine seawater solution for a period of 30 minutes or more. Then wash the food particles by UV sterilised seawater again on the small mesh before feeding to larvae.

Prepared food materials with seawater may be distributed equally in the rearing water using for example a pipette. Food particles will sink to the bottom of the rearing tank. Food particles remaining in the rearing tank after feeding should be cleaned out before adding the next lot of food. The feeding level changes depending on growth stage and intermoult stage. The level of feeding should be adjusted by taking note of how much food remains from the previous feed.

Phyllosomas start eating from the night of hatching. To obtain synchrony of larval moult, it is preferred to not feed on the morning of Day 1. As the phyllosomas start eating more, so preferably adjust the feeding level depending on level of remaining food. Feed preferably twice a day in the early morning and late evening. At Day 5–6, the phyllosomas start preparing to moult, so the feeding level may be decreased from the evening of Day 5.

First instar phyllosomas moult to the second instar in the early morning, so the feeding level in the morning may be minimised, with more in the late evening. On days 7–9, feeding twice a day is still acceptable but towards Day 9 phyllosomas start to eat more. Monitoring the level of remaining food regularly is preferred to avoid starving the phyllosomas, feeding 3 times a day if necessary. On days 9–10, feeding levels will still be high, even before moulting. It is preferred to make sure enough food is available through the nights to avoid cannibalism in the morning.

Larvae usually moult to the third instar in the early morning (4–5 am), and therefore it is preferred to make sure enough food is available before and during the moulting stage. An extra feeding before moulting is desirable, if there is no food remaining in the tank. Post-moult stage larvae will not eat food for 3–6 hours, and therefore the morning feed should be minimised, with a higher level in the afternoon. From Day 12–16, larvae may be fed 3 times a day, preferably every 8 hours such that food is always available. Starvation of phyllosomas will cause a high level of cannibalism when third instar phyllosomas moult to fourth instar phyllosomas.

Fourth instar phyllosomas (pay 15–27) may be fed over Days 15–17 at three times a day, preferably making sure food is always available. At days 18–21, the feeding level of phyllosomas is now at its peak. Larvae may be fed three times a day or more, preferably without delaying any of the three feedings for more than 2 hours. From day 21–30, phyllosomas start to metamorphose to the nisto stage, and therefore the feeding level should be decreased with the decreasing number of fourth instar phyllosomas. When phyllosomas are not eating food around day 25–26, feeding can be reduced to only twice a day.

Under optimal rearing conditions (physical and nutritional), intermoult periods of phyllosomas are preferably synchronised. The timing of these moultings depends on the rearing conditions (temperature, food condition, stock density and so on), and therefore it is preferable to maintain optimal rearing conditions throughout all larval stages.

Larvae can be reared using only one rearing tank in accordance with the present invention, with no tank exchange required. When fourth instar phyllosomas metamorphose to the nisto, pre-metamorphosis phyllosomas should be transferred to the nisto tank. Metamorphosis always occurs in the late evening just after sunset. Pre-metamorphosis phyllosomas can be identified by changes in the external morphology: the appearance of "W" shaped gaps at the basement of the antenna (these become the eye sockets); small dots on the carapace; and the changing of body colour to white. Pre-metamorphosis phyllosomas should be transferred with seawater to the nisto tank.

To avoid bacterial contamination, human contact with larval rearing water must be avoided. For example, it is preferred to wash hands with an anti-bacterial soap before the treatment for larvae. Plastic instruments may be kept, for example, in a 0.01% chlorine water bath when they are not being used. Preferably, change the water completely every 3–4 days. Glass instruments may be washed carefully with fresh water and keep on a shelf when dry.

Phyllosomas can start eating immediately after hatching, but this depends on yolk retention of larvae and temperature. In general, phyllosomas start eating 6–12 hours after hatching, but can survive for up to 72 hours without food. Starvation time of up to 48 hours at 27° C. will have no influence on survival and moulting. The 50% level of Point of No Return ($PNR_{50}$) is generally 72 hours after hatching, but this will change depending on yolk retention of larvae. Delaying the initial feeding will prolong the duration of the first instar. After moulting to the second instar, the initial starvation will have no further influence on growth.

Phyllosomas eat less food at pre- and post-moulting stages (±12 hours of moulting) than during the middle of the intermoult periods. In the middle of the intermoult periods, phyllosomas eat constantly, day and night. Although phyllosomas have a strong capacity for starvation and can survive for more than 72 hours without food, long-term starvation and lower feeding levels will result in an increased risk of MDS at the time of moulting.

Phyllosomas are not passive feeders; they approach and attack prey. The phyllosomas attack (pick up) the food using pereiopods, and pass to the mouthparts, located at the central part of the carapace (ventral side). The mouthparts comprise the labrum, pared paragnaths, mandibles and 1st maxilliped. The labrum and paragnaths cover the top of the mandibles. The food particles are pushed onto the paragnaths by the 1st maxilliped, and cut roughly into small food masses. Then the mandibles, which have a scissor-like structure on the anterior-tip, break down the food into even smaller pieces. Therefore phyllosomas can only eat soft food masses with a high water content.

After phyllosomas ingest food materials into the gut system, the colour of the midgut gland changes from transparent to white, due to the appearance of lipid rich globules within the cytoplasm of the midgut gland cells. Only a portion of the ingested food materials goes into the midgut gland area, where the main part of digestion occurs. The majority of food materials pass through the midgut tubule and are excluded via the anus, 5 to 10 minutes after eating. Faeces of phyllosomas are lipid-rich pseudo-faeces.

Phyllosomas are plankton, and usually swim in the same direction as the water current. However, phyllosomas are also strongly photopositive and can swim across a water current of 10–15 m per minute towards a light source. In the hatchery, phyllosomas congregate at the spot where light intensity is the highest during the daytime, but spread themselves evenly in the water column during the night-time. Phyllosomas show a strong photopositive phototaxis even under illuminance levels of 0.5 $\mu Em^{-2}sec^{-1}$. Phyllosomas can also swim to the bottom of the tank and pick up food materials against a water current of 10–15 m per minute. When phyllosomas are healthy, they swim with rotation of their bodies.

Moulting usually only occurs in the early morning around sunrise. The pre-moult stage (where the internal chemical composition of phyllosomas change) starts 2–3 hours before the actual moulting. The pre-moult stage larvae can be identified by a change in body colour (transparent to white-pink) and swelling of the carapace. Post-moult phyllosomas are very soft and fragile for 2–3 hours. Movements of post-moult stage phyllosomas will depend on the water current. Cannibalism occurs only at the time of moulting, when intermoult larvae eat post-moult and pre-moult stage phyllosomas. Post-moult phyllosomas start to eat food 2–4 hours after moulting.

Metamorphosis only occurs in the late evening around sunset, with the process lasting only 10–20 minutes. Pre-metamorphosis phyllosomas can be distinguished by their external morphology: small dots on the middle of the carapace (these become the top edge of carapace after metamorphosis) and "W" shape gaps at the basement of antenna (these become the eye sockets). The entire body of pre-metamorphosis phyllosomas is thick and tends to be bright-white.

Cannibalism of phyllosomas can be observed only at the time of moulting, where intermoult stage phyllosomas eat pre- and post-moult stage phyllosomas. However, if nutritional requirements of phyllosomas are satisfactory throughout the intermoult period, the level of cannibalism should be minimised.

The causes of phyllosoma diseases can be divided into bacterial, fungal, nutritional, viral and environmental or stress origins. Contamination by bacteria is the major problem in rearing phyllosomas. The most common sources of bacterial contaminations are starter culture (eggs), incoming water and foods. Sterilisation of the seawater by physical methods, such as filtration, UV, and/or chemical methods, such as chlorination and ozonisation, is effective in preventing diseases of bacterial origin. There are a number of critical diseases originating from bacteria.

Toward the end of larval rearing (amongst fourth instar phyllosomas), Vibrio infection will result in gut blockage. The symptom is accumulation of food material in the midgut tubule (constipation). Larvae will die after 6–12 hours. The midgut path is infected by Vibrio, and gut material is no longer excluded from the midgut tubule. This disease is not contagious. An accumulation of bacteria on the bottom surface of the rearing tank is thought to cause this disease. Daily maintenance, particularly of the bottom surface, is an important factor in prevention. Alternatively, exchanging the rearing tank can reduce mortalities from this disease.

The pared antenna glands are an excretory organ located at the base of the antenna. The antenna glands are surrounded by a single cell layer called a bladder, where ammonia is selectively transported from the hemolymph. The bladder is connected to the opening at the surface of the carapace, and ammonia is excreted via the opening. The diameter of this opening is less than 5 $\mu$m. Because of a high level of ammonia around the opening of antenna glands, filamentous bacteria can grow easily and shade the opening of the antenna gland, causing necrosis at a cell layer. Healthy antenna glands are transparent, but their colour will change to brown/black after necrosis. If both antenna glands are infected, larvae will die after 24–48 hours. Streptomycin at 10 ppm can prevent bacterial growth, but there is no cure for necrosis of the antenna gland. Daily cleaning of the larval tank system is an important means of reducing mortalities caused by this type of disease.

Filamentous (Leucothrix sp) bacterial infection can be observed on the surface of the exoskeleton. Poor water quality management is the cause. Though streptomycin sulphate at 10 ppm is an effective preventative measure, the continual use of antibiotics should be avoided.

Fungal origin diseases may include infections from marine fungi commonly found in seawater, and occasionally grow on the surface of the larval exoskeleton, particularly on the exopodal setae of periopods. Marine fungi start to grow 3–4 days after hatching and moulting. Fungi growing on the exopodal setae sticks will attract food particles, and as a result larvae will be "glued" together. These larvae will not die immediately, but feeding and swimming will be destructive, causing high mortality two or three days after the appearance of the fungi. Formalin at 20 ppm twice a day can prevent marine fungi growth, but will not be effective against fungi already on the surface of larval exoskeleton.

Nutrition is an important factor for not only obtaining optimal growth, but also for prevention of any kind of disease. Phyllosomas should have some degree of resistance against diseases of bacterial origin if their nutritional requirements have been adequately met. Moult Death Syndrome (MDS) is a catastrophic syndrome, observed at the time of moulting. Larvae simply stop moulting in the middle of the process and die. This syndrome cannot be predicted until the time of moulting. During intermoult periods, larval survival and activity are always high, and intermoult periods are usually synchronised. Seasonal variation in the nutritional content of natural foods (bivalves, pipis) is considered to be the major cause of MDS. During early spring (September) to mid-summer (December), a high level of MDS is observed with the feeding of non-enriched pipis. MDS levels are much lower between mid-summer (January) and autumn (June).

Enrichment of pipis (improvement of nutritional value) as described above is an effective way to prevent this syndrome. However, occasionally MDS will still occur even when phyllosomas are fed on enriched pipis. Obviously, some other factors, such as high density (less individual feeding) and inconsistent environmental conditions (inconsistent nutritional uptake) are inter-related in some way with MDS.

Diseases originating from environmental (physical and chemical) stress are not contagious. Environmental stress can manifest as white spots, with particles in the hemolymph clumping together. A high level of chemical contamination (chlorine, formalin etc) and physical stress (high stock density, freshwater drops from the cover) is the likely cause. Phyllosomas will die within 24 hours of the appearance of these white spots. There is no treatment.

POST LARVAL (NISTO) REARING

After metamorphosis to the nisto stage, nistos are reared in a nisto tank. The exoskeleton of nistos is transparent and not calcified. The colour of nistos changes from transparent-white to orange in colour due to the development of pigmentation under the exoskeleton. Water quality in the nisto rearing tank is the same as that of phyllosoma rearing. Nistos can be reared at a high density (>100 nistos per l). During the nisto stage, feeding is not required. The duration of the nisto stage is approximately 7 days, with the temperature kept at 26–27° C. To avoid cannibalism, separate pre-metamorphosis phyllosomas from other intermoult phyllosomas. The same design as the larval rearing tank may be used for nistos, such as a one-way circular tank. The water should be treated in the metamorphosis tank in the same manner as the larval rearing tank. No feeding is required. No aeration is required.

JUVENILE CULTURE

After 7 days, nistos moult to the juvenile stage. Moulting to juveniles always occurs during the night. The exoskeletons of juveniles are calcified and pigmented. Newly moulted juveniles should be collected from the nisto tank the next morning and transferred to the juvenile holding tank.

Juveniles are nocturnal. Preferably, feed only once a day in the evening and clean the remaining food and faeces out the next morning. Adjust feeding levels according to the amount of remaining food. The food size for first instar juveniles is similar size to that of second or third instar phyllosomas. Chopped flesh of enriched pipis is suitable for up to at least fourth instar juveniles, then non-enriched pipis, squids, scallops and mussels can be used. The optimal temperature for culturing juveniles is 26–27° C.

BROODSTOCK

After catching, live berried females may be stored in a tank within the vessel, preferably equipped with gentle aeration and/or water exchange. Feeding is not required. Environmental conditions, particularly water temperature and salinity, should be kept constant during the storage of the live animals.

Berried females should then be transported with water. Although berried females can survive without water for around 30 hours, long-term air exposure is physically stressful and occasionally berried females will scrape the eggs from their abdomen several days after delivery to the hatchery.

Small quantities of berried females (<6) can be transported in a plastic bag packed with water (10–20 l) plus pure oxygen. The plastic bag is then placed in an esky, and sent to the hatchery. Berried females and their eggs can travel between 24–36 hours in the bags without ill effect.

For a larger quantity of berried females (>6), a fish transporter is recommended. More than 1 l of seawater per animal is an appropriate volume. During transport, pure air or oxygen should be supplied at more than 2 l per minute. Up to 24 hours of travel by this method will not adversely affect the berried females or the eggs.

The berried females are preferably kept in a holding tank with a seawater exchange of more than 100% per hour with aeration (>2 l air per min). A minimum of 30 l of seawater per animal is required. The seawater is preferably sterilized by UV before use. The tank is preferably covered such as with a black plastic sheet. The temperature of the water in the holding tank is preferably kept between 20–28° C., with it being particularly preferred to maintain 26–27° C. Daily temperature variation should no be greater than 1° C.

The females may be fed once a day in the evening, and preferably with cleaning the remaining food out the next morning. Preferably, the food is selected from the flesh of molluscs, such as pipis, squids and mussels. The food is preferably sterilised by 0.1% chlorine solution for at least half an hour, and then carefully washed by UV sterilised seawater before feeding.

BROODSTOCK HOLDING SYSTEM

The broodstock holding system may comprise a round or square tank with a capacity of more than 200 l. There is preferably provided a black cover sheet on the top of the holding tank to minimise stress of broodstock. Gentle aeration may be provided, typically at about >2 l air per minute. Seawater may be supplied from one end of the tank, preferably from the bottom of tank, and discharged from the other end, preferably from the top of tank.

The water supply is preferably 1–5 $\mu$m filtered and UV sterilised water, with a minimum of 30 l seawater per animal. An exchange ratio of >100% per hour is preferred, at a temperature between 20–28° C. and preferably 26–27° C.

Females are preferably fed once daily in the evening with food clean out the next morning by such as by siphoning, and scraping the bottom with a sponge. It is preferred to change the tank to new clean tank every 10–15 days.

HATCHING SYSTEM

The hatching system may comprise a round or square tank, typically having a capacity of 100–200 l. Seawater may be supplied from one end of the tank, preferably from bottom. Water may be discharged through a 500 $\mu$m mesh to prevent escape of larvae. Preferably, there may be a black cover sheet on the top of the holding tank, with a 15–20 cm opening. It may be desirable to provide slow aeration of approximately 2 l per minute around the outlet. The water supply should be 0.5–1 $\mu$m filtered and UV sterilised water. Preferably, an exchange ratio of approximately 100% per hour is used, with temperature preferably kept at 26–27° C.

The hatching tank should be prepared in the afternoon, and the females transferred in the late afternoon. Feeding is not required in the hatching tank. The hatching tank should be sterilised by 0.1% chlorine for a period of 6 hours after the harvesting of larvae. If larvae have not hatched out by the next morning, females should be returned to the holding tank, and another hatching tank should be set up.

When the embryos become visibly amber-brown in colour, the individual berried female may be transferred to a 100–200 l hatching tank. The hatching tank should be prepared in the afternoon, and the females transferred in the late afternoon, prior to larvae hatching. Seawater may be supplied, previously filtered and sterilised by UV, at a rate of approximately 100% exchange per hour, exiting from a tank through a 500 $\mu$m mesh to prevent escape of larvae. Preferably, slow aeration is supplied at approximately 2 l per minute around the outlet.

Hatching always occurs at around sunrise. When the eggs hatch, the female flicks her tail several times, and larvae are scattered into the water. This lasts about 10 to 20 minutes. Hatching occurs only in the morning, and occasionally spreads over two to three mornings. To minimise stress of the female, lighting should be avoided.

After hatching, larvae are very soft and fragile, and lack swimming ability and therefore strong aeration should be avoided. The exoskeletons of the larvae become hard, and they start swimming toward a light source 20–30 mins after hatching. Harvesting of larvae is possible when they congregate at the surface of the water (light source).

Larvae can only be transferred with water. A glass beaker or glass bowl is an appropriate vessel for harvesting.

In order that this invention may be more readily understood and put into practical effect, reference will now be made to the accompanying drawings and examples which illustrate a preferred embodiment of the invention and wherein.

In the Figures, like elements are given like numerals where appropriate.

EXAMPLE

BROODSTOCK HOLDING SYSTEM

Seawater is continuously supplied to a 1 $\mu$m filter and thence to a UV sterilizer. The water supply is set at 30 l seawater per animal with an exchange ratio of 100% per hour. The temperature is maintained between 26–27° C. The sterilized water is supplied to a round tank with a capacity of 200 l. A black plastic cover sheet is provided on the top of the holding tank to minimise stress of broodstock. The tank is gently aerated at >2 l air per minute. The water is supplied continuously to one end of the bottom of the tank and discharged from the other end at the top of tank.

The berried females are introduced to the tank and fed once a day in the evening. The tank is cleaned of remaining food the next morning. The food is pipis sterilised by 0.1% chlorine solution for at least half an hour, and then carefully washed by UV-sterilised seawater before feeding.

When the embryos become visibly amber-brown in colour, the individual berried female is transported to the hatching tank.

HATCHING SYSTEM

Water is filtered and sterilized as before and continuously supplied at an exchange ratio of approximately 100% per hour, the temperature being maintained at 26–27° C. the water is supplied to a round tank with capacity of 200 l. The treated water is supplied from one end of the tank from bottom. Water is discharged through a 500 $\mu$m mesh to prevent escape of larvae. A black cover sheet covers the tank and has a 15–20 cm opening. Slow aeration at 2 l per minute is supplied around the outlet.

The hatching tank is prepared in the afternoon, and the females transferred in the late afternoon. Feeding is not required in the hatching tank. The hatching tank is sterilised by 0.1% chlorine for a period of 6 hours after the harvesting of larvae. If larvae have not hatched out by the next morning, females are returned to the holding tank, and another hatching tank is set up.

Hatching always occurs at around sunrise. When the eggs hatch, the female flicks her tail several times, and larvae are scattered into the water. This lasts about 10 to 20 minutes. Hatching occurs only in the morning, and occasionally spreads over two to three mornings. To minimise stress of the female, lighting is avoided.

After hatching, larvae are very soft and fragile, and lack swimming ability, and therefore strong aeration is avoided. The exoskeletons of the larvae become hard, and they start swimming toward a light source 20–30 mins after hatching. Harvesting of larvae is possible when they congregate at the surface of the water towards the light source.

Larvae can only be transferred with water, and a glass bowl accordingly was used to transfer the hatched larvae.

LARVAL REARING

Figure 1:
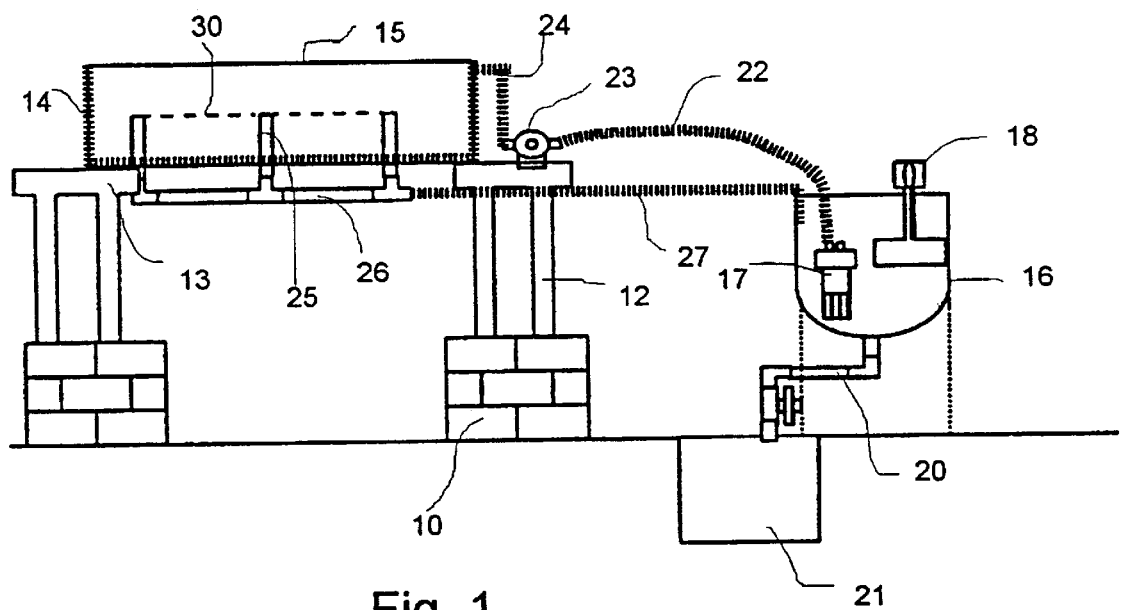
FIG. 1 is a side elevation of semirecirculation apparatus in accordance with the present invention.
Figure 2:
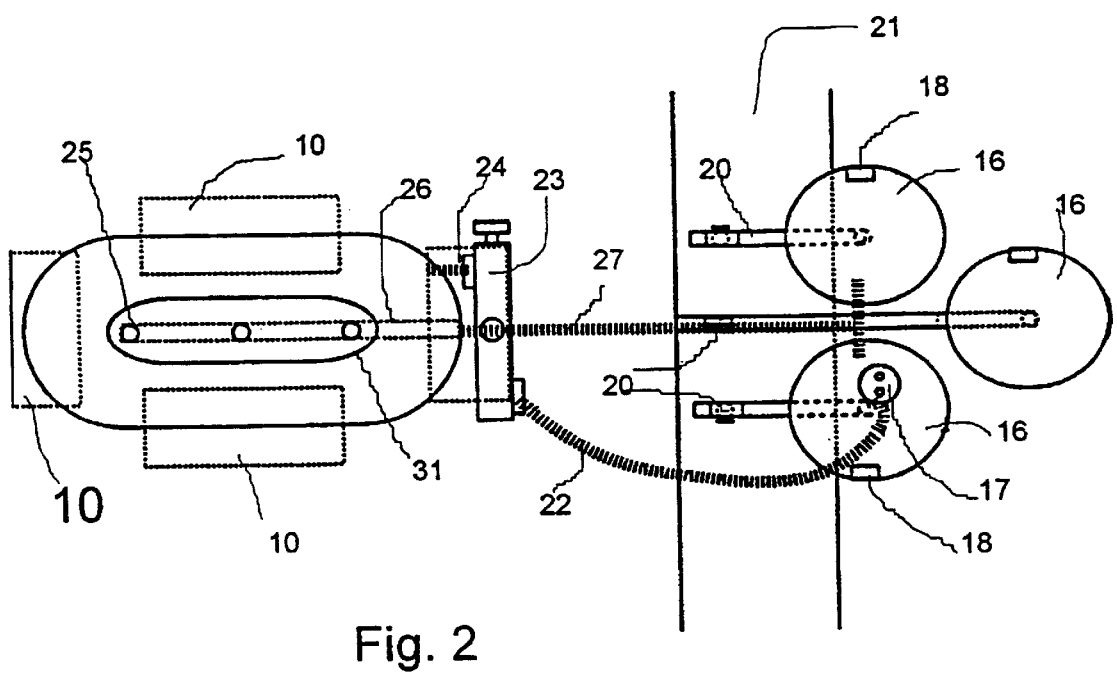
FIG. 2 is a plan view of the apparatus of FIG. 1.

Referring to the FIGS. 1 and 2, a supporting base comprising piers 10 supports a tank frame 12 including tank bearing portions 13 adapted to provide a desirable working height. A rearing tank 14 is supported on the bearing portions, and is provided with a black plastic cover 15 for use in the daytime.

A series of three sub-tanks 16 are provided, the sub-tanks being supplied by a one-micron filtered seawater supply (not shown). The capacity of each sub-tank 16 is the same as the larval rearing tank 14.

A submersible pump and filter assembly 17 is adapted to be selectively moved from one sub-tank 16 to the others. Each sub-tank is provided with a thermostat controlled heater 18. Each sub-tank 16 has a cocked drain 20 communicating with a waste drain 21.

The submersible pump and filter assembly 17 has an outlet connected to a flexible pipe 22 that supplies water to a UV sterilizer 23. The UV sterilizer 23 supplies sterilized water to the tank 14 via hose 24. The water depth in the tank 14 is set at 15 cm by the height of open-topped standpipes 25 extending up through the floor of the tank 14 and communicating with a drain manifold 26 which returns the water to the sub-tanks 16 via drain 27. The tank 14 has a mesh assembly 31 surrounding the standpipes 25 and extending from the tank floor to above the stand pipes 25.

Figure 4:
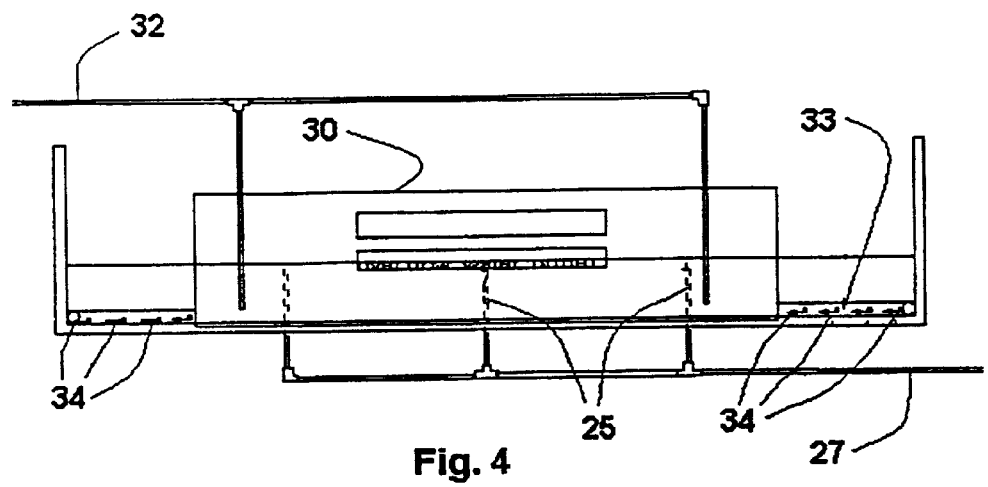
FIG. 4 is an elevation of the tank of FIG. 3.
Figure 3:
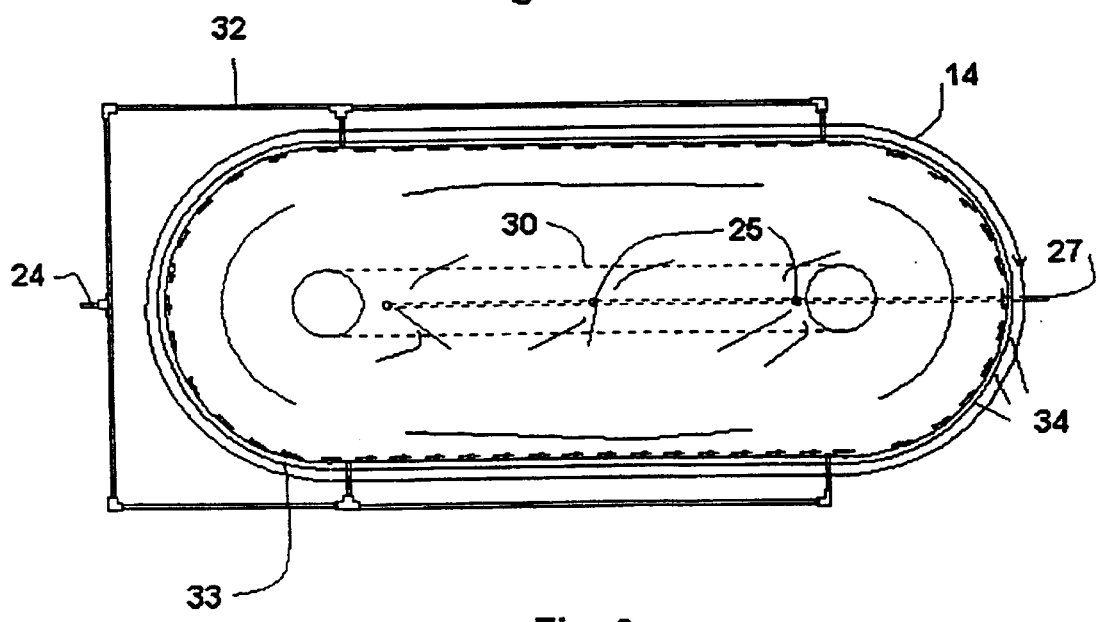
FIG. 3 is a detail plan view of a larval raising tank suitable for use in conjunction with the apparatus of FIGS. 1 and 2.

Referring to FIGS. 3 and 4, the water supply hose 24 supplies water to a manifold 32 adapted to even out distribution to an inflow nozzle annulus 33 disposed about the peripheral inner surface of the bottom of the tank 14. A plurality of nozzles 34 is disposed on the inflow nozzle annulus 33 the nozzles all being directed so as to induce a one-way endless circulation in the tank 14. The nozzle flow velocity is controlled to 5 m per minute at the 1st phyllosoma stage, and gradually increased to 15–20 m per minute at the 4th stage.

In use, water in one sub-tank 16 is circulated into the larval rearing tank 14 for 24 hours, using the submersible pump 17. After 24 hours, the pump 17 is transferred to the other sub-tank 16, with the water controlled at the same temperature (±0.5° C.). Water is then circulated into the larval rearing tank 14 again. The flow rate is the same as the one way flow-through system.

While water in one sub-tank is being used, empty and dry the other sub-tank. The rearing water supplied to the sub-tanks 16 is sterilized by 10% chlorine for a period of 12 hours, and then neutralised with 10% sodium thiosulphate. Chlorine neutralization is confirmed by Palintest® (DPD No 1) before introducing into the rearing system.

Figures 5, 6:
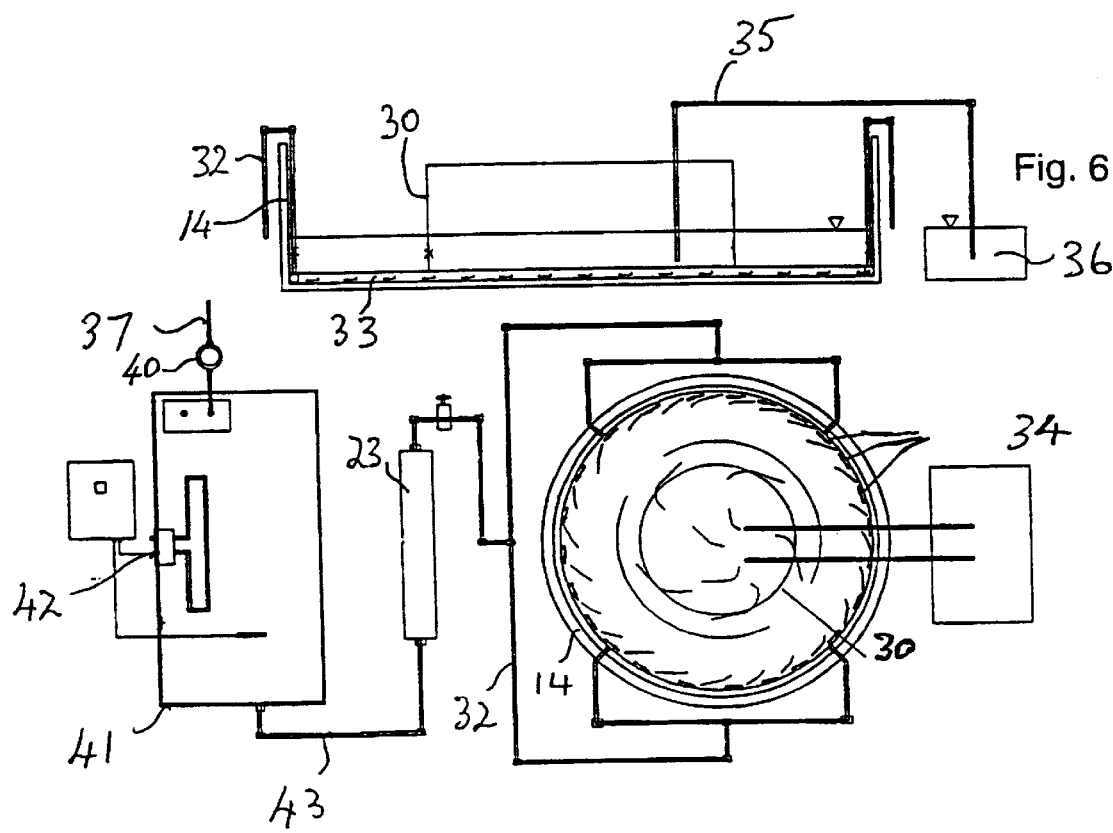
FIG. 5 is a plan view of a flow through apparatus in accordance with the present invention.
FIG. 6 is a not-to-scale elevation of the tank detail of FIG. 5.

In the embodiment illustrated in FIGS. 5 and 6, a siphon 35 communicating with an external overflow tank 36 maintains the water level. Water in this embodiment is supplied to the UV sterilizer 23 from a raw water inlet 37 via a filter to a header tank 41. The header tank 41 has a heater and thermostat assembly 42. The header tank feeds the UV sterilizer 23 via supply pipe 43.

In use, the water at the inlet 37 is filtered through the 0.5 $\mu$m filter 40 and supplied to the header tank 41. After supply to the header tank 42 the filtered, temperature controlled (26–27° C.) water is passed to the sterilizer 23 where it is subjected to 10 l/hour/Watt UV radiation. The salinity range is maintained between 34–36 ppt with salinity change being kept within ±1 ppt per day. To avoid congregation of larvae at the surface during the daytime, the rearing system is covered by a black plastic sheet. The level of pH is kept at between 8.2–8.5 (natural seawater pH level). The oxygen level of the rearing water was maintained at more than 7 ppm by the circulation of rearing water without aeration.

Rearing density

Under the flow-through system of FIGS. 5 and 6, the maximum rearing densities of phyllosomas are:

40 first instar larvae per l
25 second instar larvae per l
10 third instar larvae per l and
5 fourth instar larvae per l.

Figure 7:
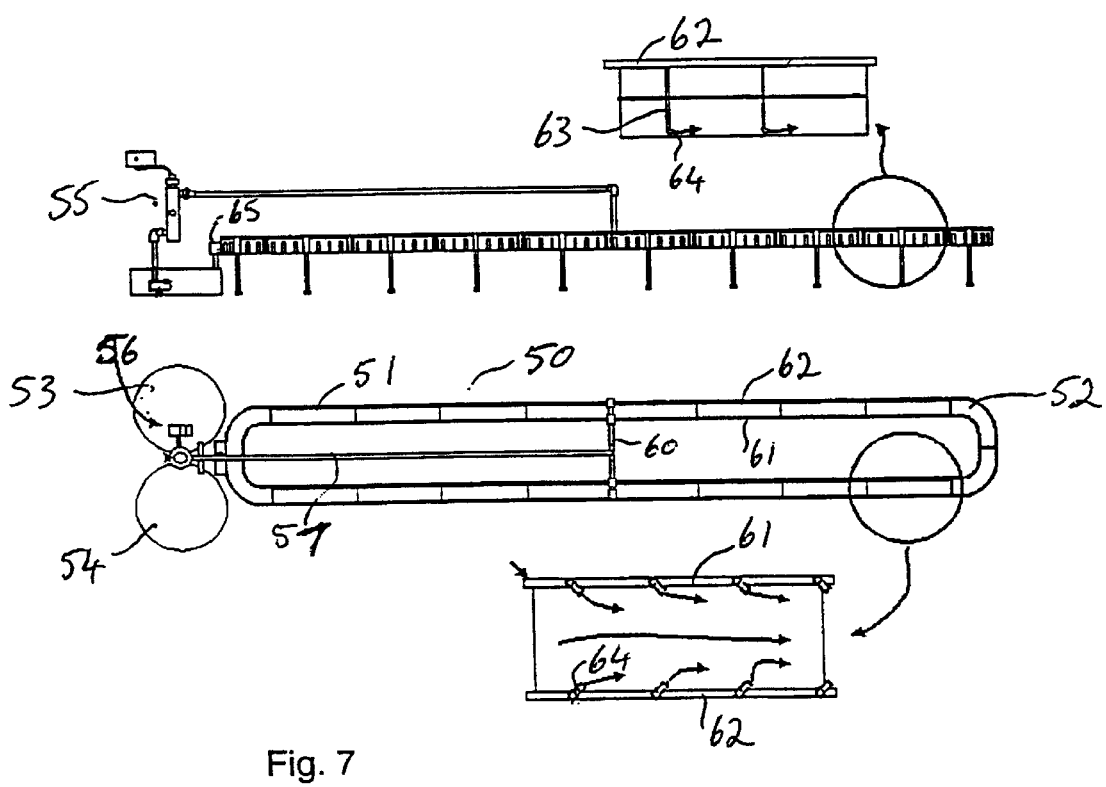
FIG. 7 is an alternative embodiment of a semirecirculation system to that illustrate FIG. 1.

In the embodiment illustrated in FIG. 7, there is provided a semi-recirculation system of alternative construction to that of FIG. 1 in that an annular larval rearing tank 50 comprises an assembly of modular straight channel sections 51 and corner channel sections 52. The channel sections 51 and 52 are formed of substantially opaque plastics material and have a wall height and width across the channel of 30 cm each. The moulded sections are adapted to be bolted together to form the tank 50 and sealed with silicon sealant.

Two sub-tanks 53, 54 are provided, each having a capacity the same or more than the larval rearing tank 50. A UV sterilizer unit 55 and submersible pump 56 circulates medium that has been filtered to 0.5–1.0 μm and pre-sterilized by 10% chlorine for a period of 12 hours, and then neutralised with 10% sodium thiosulphate. The new rearing water is tested by Palintest® (DPD No 1) before introducing into the rearing system to make sure no chlorine remains.

The medium is delivered through the UV sterilizer 55 and subjected to UV radiation at about 10 l/hour/Watt. The sterilizer 55 incorporates temperature control means comprising a heater/chiller/thermostat to maintain the temperature within ±0.5° C. Medium passes to the tank 50 by delivery pipe 57 which is manifolded via a splitter pipe 60 to inner 61 and outer 62 ring mains located at the upper edge of the inner and outer walls of the tank 50.

A plurality of droppers 63 extend down the respective walls from the ring mains 61 and 62 toward the bottom of the tank 50, each dropper terminating in a nozzle 64 oriented in the direction of circulation and away from the respective walls.

A 1 mm$^2$ meshed drain 65 enables recirculation to the subtank in use and level control in the tank 50.

Basic operation of the system is that water in one sub-tank is circulated into the larval rearing tank for 24 hours, using the submersible pump. After 24 hours, the pump is transferred to the other sub-tank, with the water controlled at the same temperature (±0.5° C.). Water is then circulated into the larval rearing tank again. While water in one sub-tank is being used, the other sub-tank is emptied to waste and dried in preparation for recharging with pretreated medium.

Figure 8:
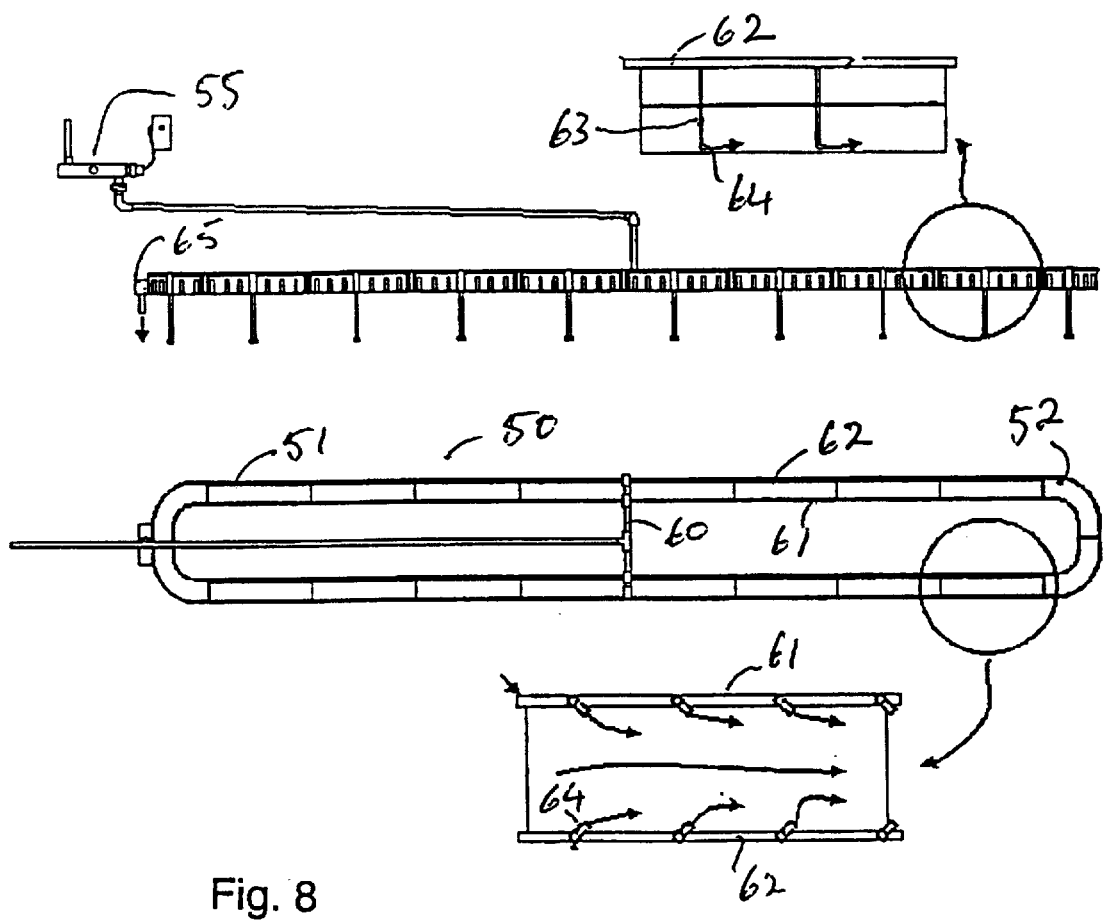
FIG. 8 is an alternative embodiment of a flow through system to that illustrated in FIG. 5.

In the embodiment of FIG. 8, this is substantially as per that of FIG. 7, except that a one way flow through system adapted to use sea water supply is illustrated. This system delivers seawater that has been filtered down to at least 1.0 μm and preferably 0.5 μm to the UV sterilizer/temperature control assembly 55 and thence to the delivery pipe. The drain 65 takes the flow passing through the system directly to waste.

Figure 9:
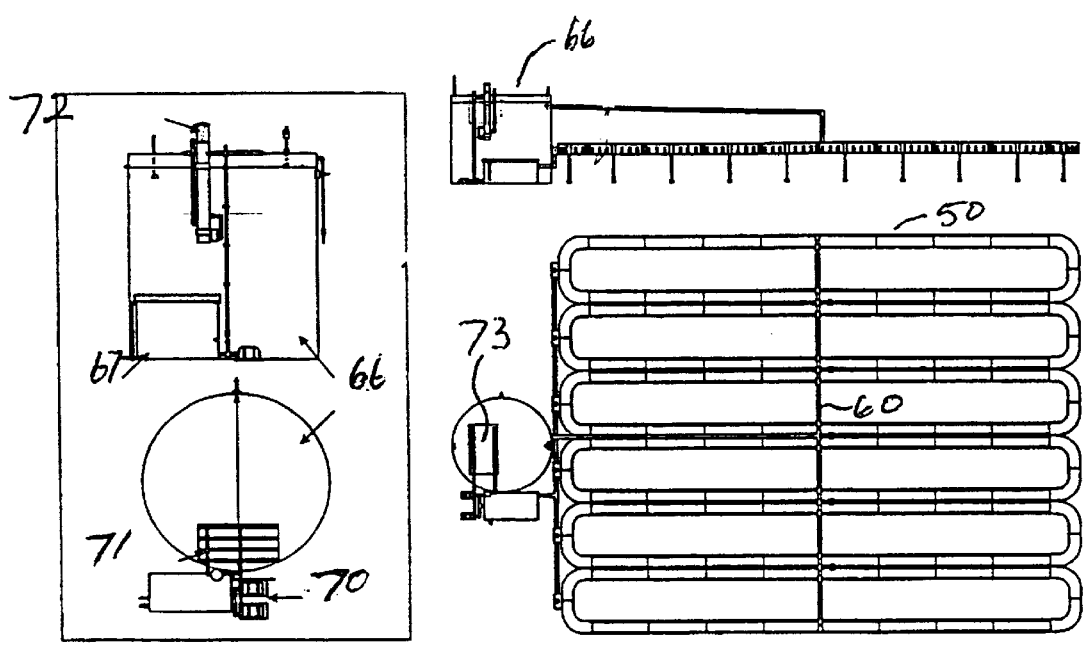
FIG. 9 is an illustration of a fully recirculated larval raising system in accordance with the present invention.

In the embodiment of FIG. 9 there is illustrated a fully recirculating system with medium regeneration. In this embodiment there is illustrated a plurality of the tanks 50 supplied with medium via a multiple splitter pipe 60. A reservoir 66 holding the same volume as the sum of the tank capacities is provided. The reservoir has a sump portion 67 adapted to receive medium from the drains 65 which are manifolded to the sump 67. A pump 70 delivers the medium to a biofilter 71, foam fractionator 72 and a processing unit 73 which integrates the functions of a UV sterilizer, ozone generator and mixer power head with venturi, as well as temperature control.

Food for larvae

To obtain a standard quality of food, enrichment of bivalves is necessary. The green micro-algae Nannochloropsis spp. is cocultured with live pipis at a temperature range maintained between 25–28° C. The cell density is maintained at more than 20×10$^7$ per ml. The algal culture is used at a rate of 1 kg of pipis wet weight per 40 l of algae water, and replace the water every 12 hours. The level of ammonia in the algae water is maintained below 1 ppm. The enrichment process is continued for 48 hours. The pipis yield 20% pipi flesh based on wet weight of pipis in the shell.

The enriched pipis were chopped roughly with a curved "dick knife" on a cutting board. The pieces were washed through a large mesh of 0.5 to 2.0 mm depending on the larval stage to be fed, and then a small mesh of 0.5 mm. the large mesh used was 1.0 mm for the first instar, 1.5 mm for the 2nd instar and 2.0 m for the 3rd and 4th instars. The pieces of chopped flesh retained between the large and small mesh sizes were set aside. The pieces of flesh retained in the large size mesh were chopped again, repeating the above process.

The processed food was sterilised before feeding by washing the flesh in UV sterilised seawater carefully, and then incubating in 0.1% chlorine seawater solution for a period of 30 minutes. The washed food particles were washed by UV sterilised seawater again on the small mesh before feeding to larvae.

The prepared food materials with sterilised seawater were distributed equally in the rearing water using a pipet. Food particles sink to the bottom of the rearing tank. Food particles remaining in the rearing tank after feeding was cleaned out before adding the next lot of food.

The feeding level changes depending on growth stage and intermoult stage. The level of feeding was adjusted by taking note of how much food remains from the previous feed. The following is the daily feed level normalised for 1000 phyllosomas in a 1 ton tank.

First instar (Day 1–Day 5)

(Day 1)

Phyllosomas started eating from the night of hatching (50 ml of chopped flesh particles). To obtain synchrony of larval moult, there was no feeding on the morning of Day 1.

(Day 2–4)

Phyllosomas started eating more, so the feeding level was adjusted depending on level of remaining food. Feeding was twice a day (50–70 ml in the early morning and late evening).

(Day 5–6)

Phyllosomas started preparing to moult, so the feeding level was decreased from the evening of Day 5 (50–70 ml in the morning, and 30–40 ml in the late afternoon). Second instar (Day 6–Day 10)

(Day 6–7)

First instar phyllosomas moulted to the second instar in the early morning, so the feeding level in the morning was minimised, with more in the late evening (50–60 ml in the morning, and 60–80 ml in the afternoon).

(Day 7–9)

Feeding twice a day was used (50–60 ml), but towards Day 9 phyllosomas started to eat more, and feeding 3 times a day became necessary.

(Day 9–10)

Feeding levels were still be high, even before mounting. Enough food was made available through the nights (70–80 ml) to avoid cannibalism in the morning.

Third instar (Day 10–16)

(Day 10–12)

Larvae moulted in the early morning (4–5 am), and therefore it was made sure enough food is available before and during the moulting stage. An extra feeding (20–30 ml) before moulting was made, as there was no food remaining in the tank. Post-moult stage larvae did not eat food for 3–6 hours, and therefore the morning feed was minimised (50–60 ml), with a higher level in the afternoon (100 ml–120 ml).

(Day 12–16)

Larvae were fed 3 times a day (70–80 ml, every 8 hours), making sure that food was always available.

Fourth instar (Day 15–27)

(Day 15–17)

Fed three times a day (60–70 ml), making sure that food was always available.

(Day 18–21)

The feeding level of phyllosomas was now at its peak. Larvae were fed three times a day (100–120 ml).

(Day 21–30)

Phyllosomas started to metamorphose to the nisto stage, and therefore the feeding level was decreased with the decreasing number of fourth instar phyllosomas. When phyllosomas are not eating food between days 25–26), feeding was reduced to only twice a day (60–80 ml). To avoid cannibalism, separation of pre-metamorphosis phyllosomas from other intermoult phyllosomas was performed.

NISTO

The nistos are reared in the same design tank as per larvae, with the water treated in the same manner.

After metamorphosis to the nisto stage, nistos are reared in a nisto tank. Water quality in the nisto rearing tank is the same as that of phyllosoma rearing. Nistos can be reared at a high density (>100 nistos per l). During the nisto stage, feeding is not required. The duration of the nisto stage is approximately 7 days, with the temperature kept at 26–27° C.

JUVENILE CULTURE

After 7 days, nistos moult to the juvenile stage. Moulting to juveniles always occurs during the night. The exoskeletons of juveniles are calcified and pigmented. Newly moulted juveniles should be collected from the nisto tank the next morning and transferred to the juvenile holding tank.

Juveniles are nocturnal. Feed only once a day in the evening and clean the remaining food and faeces out the next morning. Adjust feeding levels according to the amount of remaining food. The food size for first instar juveniles is similar size to that of second or third instar phyllosomas. Chopped flesh of enriched pipis is suitable for up to at least fourth instar juveniles, then non-enriched pipis, squids, scallops and mussels can be used. The optimal temperature for culturing juveniles is 26–27° C.

It will of course be realised that while the foregoing has been given by way of illustrative example of this invention, all such and other modifications and variations thereto as would be apparent to persons skilled in the art are deemed to fall within the broad scope and ambit of this invention as defined in the claims appended hereto.

I claim:

1. A Thenus spp., rock lobster or slipper lobster larva raising method including the steps of:
   providing an annular tank adapted to hold larva raising medium to a depth of at least 10 cm to less than 1 meter;
   continuously supplying substantially sterilized, filtered larva raising medium to said tank through a plurality of outlets disposed about an annular side wall of the tank and adapted to cause horizontal circulation of said medium and having an outlet flow velocity selected to prevent larva damage;
   continuously draining said medium through a tank depth-regulating drain assembly including a larva screen having a flow velocity of said medium therethrough selected to prevent damage to larvae, and
   maintaining said medium at a temperature selected to accommodate the larva species to be raised by control of the temperature of said substantially sterilized, filtered larva raising medium.

2. A method according to claim 1, wherein said temperature is controlled to be at substantially the same temperature ±0.5° C. as the source of the larva introduced to said tank.

3. A method according to claim 2, wherein the salinity of said medium is maintained in the range of between 25–40 ppt.

4. A method according to claim 2, wherein said circulation and stocking density is selected whereby the oxygen level of the rearing water is maintained at a level of at least 7 ppm, at 26–27° C.

5. A method according to claim 1, wherein the larva are phyllosomas of Moreton bay bugs, and wherein the temperature range of the medium is maintained between 26–27° C.

6. A method according to claim 5, wherein the salinity of said medium is maintained in the range of between 25–40 ppt.

7. A method according to claim 6, wherein said salinity is varied by less than 1 ppt per day.

8. A method according to claim 6, wherein the level of pH is kept at between 7–9.

9. A method according to claim 5, wherein the level of pH is kept at between 7–9.

10. A method according to claim 5, wherein said circulation and stocking density is selected whereby the oxygen level of the rearing water is maintained at a level of at least 7 ppm, at 26–27° C.

11. A method according to claim 10, wherein the maximum rearing densities of phyllosomas are:
    40 first instar larvae per l
    25 second instar larvae per l
    10 third instar larvae per l and
    5 fourth instar larvae per l.

12. A method according to claim 5, wherein said temperature is controlled to be at substantially the same temperature ±0.5° C. as the source of the larva introduced to said tank.

13. Thenus spp., rock lobster or slipper lobster larva raising apparatus including:
    a supply of substantially sterilized, filtered larva raising medium;
    an annular tank adapted to hold larva raising medium to a depth of at least 10 cm to less than 1 meter;
    a plurality of outlets on an annular side wall of the tank, connected to said supply and adapted to deliver and cause horizontal circulation of said medium in said tank;
    drain means including a larva screen having a flow velocity of said medium therethrough selected to prevent damage to larvae and configured to maintain a selected level in said tank, and
    temperature control means for said medium supply.

14. Crustacean larva raising apparatus according to claim 13, wherein said larval rearing tank comprises an annular raceway having straight portions closed by substantially part-circular end portions.

15. Crustacean larva raising apparatus according to claim 14, wherein said raceway comprises a modular construction of said substantially part-circular end and straight portions, whereby the linear dimensions and thus holding capacity may be selected.

16. Crustacean larva raising apparatus according to claim 15, wherein said corner and straight portions are moulded in plastics material and are adapted to be bolted up in assembly to form the raceway.

17. Crustacean larva raising apparatus according to claim 14, wherein said end and straight portions are moulded in plastics material and are adapted to be bolted up in assembly to form the raceway.

18. Crustacean larva raising apparatus according to claim 17, wherein said tank has a depth of less than one meter.

19. Crustacean larva raising apparatus according to claim 13, wherein said tank has a depth of less than one meter.

20. Crustacean larva raising apparatus according to claim 19, wherein the medium depth is maintained between 10 to 20 cm.

21. Crustacean larva raising apparatus according to claim 13, wherein the medium depth is maintained between 10 to 20 cm.

22. Crustacean larva raising apparatus according to claim 21, wherein said tank is adapted to be arrayed in stacks.

23. Crustacean larva raising apparatus according to claim 13, wherein said tank is adapted to be arrayed in stacks.

24. Crustacean larva raising apparatus according to claim 23, wherein said water outlet comprise a plurality of nozzles directed to encourage the continuous one way circulation with consistent flow about the circuit.

25. Crustacean larva raising apparatus according to claim 13, wherein said water outlets comprise a plurality of nozzles directed to encourage the continuous one way circulation with consistent flow about the circuit.

26. Crustacean larva raising apparatus according to claim 25, wherein said nozzles in use have a flow velocity of less than 6 m per minute.

27. Crustacean larva raising apparatus according to claim 26, wherein said flow velocity is the minimum flow rate consistent with maintaining circulation of the medium in the tank.

28. Crustacean larva raising apparatus according to claim 27, wherein said plurality of outlets are manifolded to said continuous supply by a linear or ring mains manifold.

29. Crustacean larva raising apparatus according to claim 13, wherein said plurality of outlets are manifolded to said continuous supply by a linear or ring mains manifold.

30. Crustacean larva raising apparatus according to claim 29, wherein said linear or ring mains manifold is disposed about an upper portion of the tank above the selected level of said medium, said outlets being in the region of the bottom of the tank and connected to said manifold by droppers.

31. Crustacean larva raising apparatus according to claim 30, wherein said tank is an annular tank and wherein one said manifolds disposed on each of the upper portions of the inner and outer walls of the tank.

32. Crustacean larva raising apparatus according to claim 31, wherein said plurality of outlets comprise nozzles and said horizontal circulation is effected by aiming said nozzles in a direction having a component in the direction of desired circulation and a component in a direction inwardly of a side wall of said tank.

33. Crustacean larva raising apparatus according to claim 13, wherein said plurality of outlets comprise nozzles and said horizontal circulation is effected by aiming said nozzles in a direction having a component in the direction of desired circulation and a component in a direction inwardly of a side wall of said tank.

34. Crustacean larva raising apparatus according to claim 33, wherein said medium supply is a continuous supply selected from recirculating non-recirculating and partial recirculating supplies.

35. Crustacean larva raising apparatus according to claim 13, wherein said medium supply is a continuous supply selected from recirculating, non-recirculating and partial recirculating supplies.

36. Crustacean larva raising apparatus according to claim 35, wherein said medium is filtered to a particle size of less than 1 mm.

37. Crustacean larva raising apparatus according to claim 13, wherein said medium is filtered to a particle size of less than 1 mm.

38. Crustacean larva raising apparatus according to claim 37, wherein said medium is sterilized by one or more of physical, chemical or radiation means.

39. Crustacean larva raising apparatus according to claim 13, wherein said medium is sterilized by one or more of physical, chemical or radiation means.

40. Crustacean larva raising apparatus according to claim 39, wherein said sterilization in by one or more of UV sterilization, submicron filtration, chlorination/neutralisation, acidification/neutralisation and ozonisation.

41. Crustacean larva raising apparatus according to claim 40, wherein said drain means is provided with a meshed drain opening having a mesh size of about 1 mm.

42. Crustacean larva raising apparatus according to claim 13, wherein said drain means is provided with a meshed drain opening having a mesh size of about 1 mm.

43. Crustacean larva raising apparatus according to claim 42, wherein said meshed drain opening is selected to have an outflow velocity selected to be less that the outlet flow velocity through the outlets in use.

44. Crustacean larva raising apparatus according to claim 43, wherein said drain means comprises a surface drain set to a medium level of from 10 to 20 cm.

45. Crustacean larva raising apparatus according to claim 42, wherein said drain means comprises a surface drain set to a medium level of from 10 to 20 cm.

46. Crustacean larva raising apparatus according to claim 45, wherein said surface drain is set on a standpipe which is adjustable in length.

47. Crustacean larva raising apparatus according to claim 46, wherein there is further provided cover means for said tank, the cover means and said tank being selected to be substantially opaque to ambient light in use.

48. Crustacean larva raising apparatus according to claim 13, wherein said drain means comprises a surface drain set to a medium level of from said tank being selected to be substantially opaque to ambient light in use.

49. Crustacean larva raising apparatus according to claim 48, wherein said temperature control means includes a thermostat and comprises one or both of a heater and chiller.

50. Crustacean larva raising apparatus according to claim 13, wherein said temperature control means includes a thermostat and comprises one or both of a heater and chiller.

51. Crustacean larva raising apparatus according to claim 50, wherein said temperature control means is selected to maintain the temperature of said medium to a selected temperature ±0.5° C.

* * * * *

UNITED STATES PATENT AND TRADEMARK OFFICE
CERTIFICATE OF CORRECTION

PATENT NO. : 6,561,134 B1
DATED : May 13, 2003
INVENTOR(S) : Satoshi Mikami

It is certified that error appears in the above-identified patent and that said Letters Patent is hereby corrected as shown below:

Column 1,
Line 9, "Thenus spp." should read -- *Thenus spp.* --.
Table 1, last column entitled "Tank Size", every instance of "1" should read -- *l* --.
Table 1, column entitled "Species", last line "(Ibacus spp.)" should read
-- (*Ibacus spp.*) --.
Table 2, column entitled "Other Species", second line "(Ibacus spp.)" should read
-- (*Ibacus spp*) --.

Column 2,
Lines 30, 31, 36, 37, 41, 42, 47, 48, 49 and 50, in each instance "1" should read -- *l* --.
Line 54, "Thenus spp." should read, -- *Thenus spp.* --.
Line 59, "Thenus sp." should read, -- *Thenus sp.* --.

Column 4,
Lines 8 and 9, "1" should read -- *l* --.
Line 25, "1 st" should read -- 1$^{st}$ --.

Column 5,
Lines 11 and 12, "1 l/hour/Watt" should read, -- 10*l*/hour/Watt --.

Column 6,
Lines 8 through 11 and 35, "1" should read, -- *l* --.
Line 18, "(Donax spp.)" should read, -- (*Donax spp.*) --.
Line 20, "(Atemia spp.)" should read, -- (*Artemia spp.*) --.
Line 25, "Thenus," should read, -- *Thenus,* --.
Line 28, "Nannochloropsis spp." should read, -- *Nannochloropsis spp.* --.
Line 29, "Isochrsis spp.," should read, -- *Isochrsis spp.,* --.
Line 30, "Chaetoceros spp." and "Pavlova spp." should read, -- *Chaetoceros spp* -- and
-- *Pavlova spp* --.

Column 7,
Line 36, "(pay 15-27)" should read, -- (Day 15-27) --.

Column 10,
Line 47, "(>100 nistos per l)" should read, -- (>100 nistos per *l*) --.

Column 11,
Line 24, "1 l" should read, -- 10 *l* --.
Lines 19, 24, 26, 31, 47, 50, 55 and 64, in all instances replace "1" should read -- *l* --.

UNITED STATES PATENT AND TRADEMARK OFFICE
CERTIFICATE OF CORRECTION

PATENT NO.    : 6,561,134 B1
DATED         : May 13, 2003
INVENTOR(S)   : Satoshi Mikami It is certified that error appears in the above-identified patent and that said Letters Patent is hereby corrected as shown below:

Column 12,
Lines 3, 16, 22 and 65, in all instances replace "l" with -- $l$ --.

Column 13,
Lines 2, 4, 19 and 24, in all instances replace "l" with -- $l$ --.

Column 14,
Line 41, "10 l" should read, -- 10$l$ --.
Lines 53 through 56, "l" should read -- $l$ --.

Column 15,
Line 8, "10 l/hour/Watt." should read, -- 10$l$/hour/Watt. --.
Line 56, "40 l" should read -- 40$l$ --.

Column 17,
Line 14, "(>100 nistos per l)" should read, -- (>100 nistos per $l$) --.

Signed and Sealed this

Thirtieth Day of September, 2003

JAMES E. ROGAN
*Director of the United States Patent and Trademark Office*